US008719361B2

(12) United States Patent
Umezawa et al.

(10) Patent No.: US 8,719,361 B2
(45) Date of Patent: May 6, 2014

(54) RELAY DEVICE, MAC ADDRESS SEARCH METHOD

(75) Inventors: Yasushi Umezawa, Kawasaki (JP); Takeshi Shimizu, Kawasaki (JP); Takashi Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 12/855,246

(22) Filed: Aug. 12, 2010

(65) Prior Publication Data

US 2011/0040849 A1 Feb. 17, 2011

(30) Foreign Application Priority Data

Aug. 17, 2009 (JP) ................................ 2009-188220

(51) Int. Cl.
*G06F 15/167* (2006.01)

(52) U.S. Cl.
USPC ........... 709/213; 709/224; 709/250; 370/383; 370/352; 370/310; 370/394; 370/402

(58) Field of Classification Search
USPC .......... 709/213, 224, 250; 370/383, 352, 310, 370/394, 402
See application file for complete search history.

(56) References Cited

U.S. PATENT DOCUMENTS

| 7,477,639 | B2 | 1/2009 | Shimizu et al. |
| 7,580,380 | B2* | 8/2009 | Baker et al. .................... 370/310 |
| 7,743,203 | B2* | 6/2010 | France ........................... 711/103 |
| 2003/0107400 | A1* | 6/2003 | Kumamoto ...................... 326/38 |
| 2003/0131206 | A1* | 7/2003 | Atkinson et al. .............. 711/156 |
| 2004/0103253 | A1 | 5/2004 | Kamei et al. |
| 2007/0067497 | A1* | 3/2007 | Craft et al. ...................... 709/250 |
| 2007/0113001 | A1* | 5/2007 | Yamada ........................ 711/103 |
| 2008/0112401 | A1* | 5/2008 | Brown ........................... 370/383 |
| 2008/0250496 | A1* | 10/2008 | Namihira ......................... 726/22 |
| 2008/0279005 | A1* | 11/2008 | France ..................... 365/185.11 |
| 2009/0201916 | A1* | 8/2009 | Caron et al. ................... 370/352 |
| 2009/0279548 | A1* | 11/2009 | Davis et al. .................... 370/394 |
| 2009/0296727 | A1* | 12/2009 | Srinivasan .................... 370/402 |
| 2010/0180145 | A1* | 7/2010 | Chu ................................. 714/2 |
| 2011/0238820 | A1* | 9/2011 | Matsuoka ..................... 709/224 |

FOREIGN PATENT DOCUMENTS

| JP | 2000-215100 | 8/2000 |
| JP | 2004-178016 A | 6/2004 |
| JP | 2005-11434 A | 1/2005 |
| JP | 2005-115906 | 4/2005 |
| JP | 2005-236997 | 9/2005 |
| JP | 2006-295550 A | 10/2006 |

OTHER PUBLICATIONS

Partial English-language Translation of Japanese Office Action mailed May 17, 2011 for corresponding Japanese Application No. 2009-188220.

* cited by examiner

*Primary Examiner* — Thuong Nguyen
(74) *Attorney, Agent, or Firm* — Fujitsu Patent Center

(57) ABSTRACT

A relay device includes: memories, each memory being operable to store at least a data pair formed of a MAC address and a port number; a search unit to search only amongst ones of the memories having valid data pairs when searching for a port number based upon a MAC address; a data moving unit to move valid data pairs to different locations within the plurality of memories in order to reduce a total number of memories, amongst the plurality thereof, having valid data pairs; and a power supply controller to selectively stop supplying power to ones of the memories storing only invalid data.

10 Claims, 13 Drawing Sheets

AGE OUT

FIG. 5D

MOVE

FIG. 5E

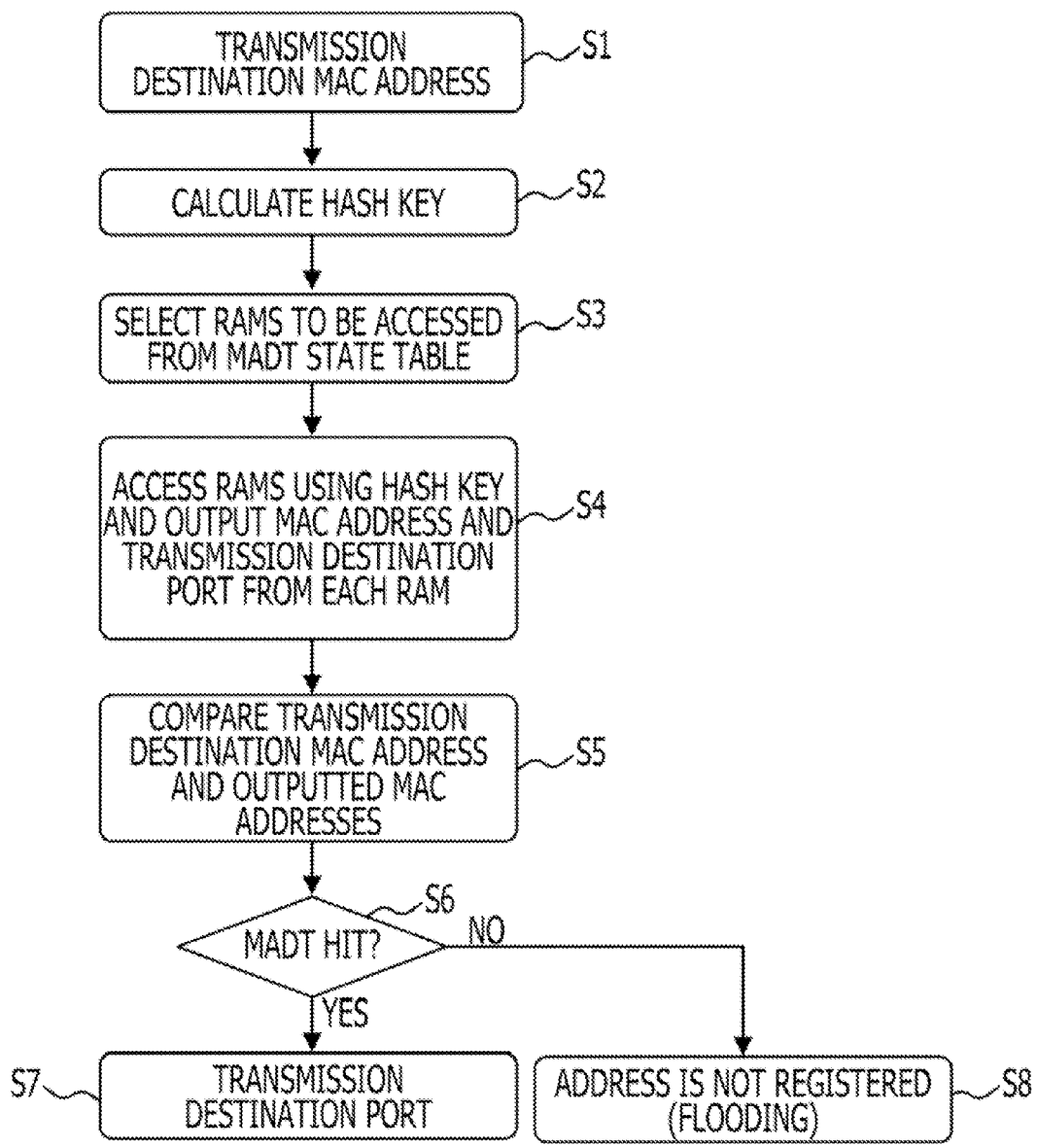

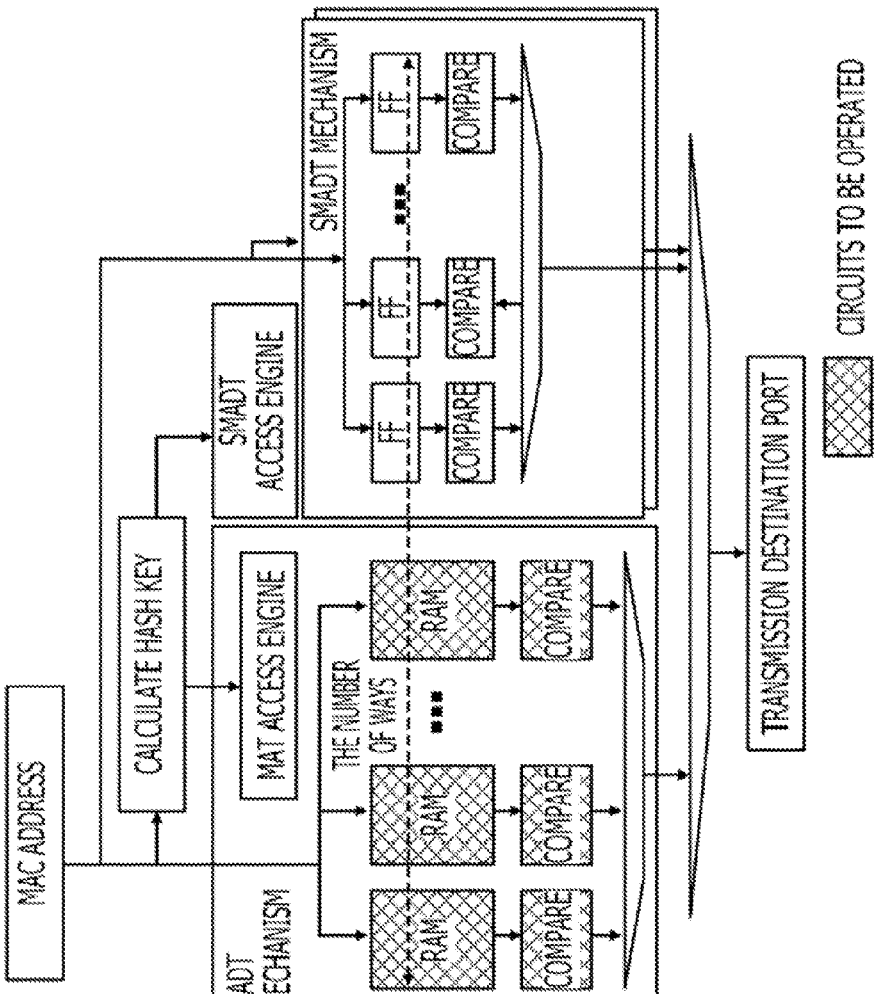
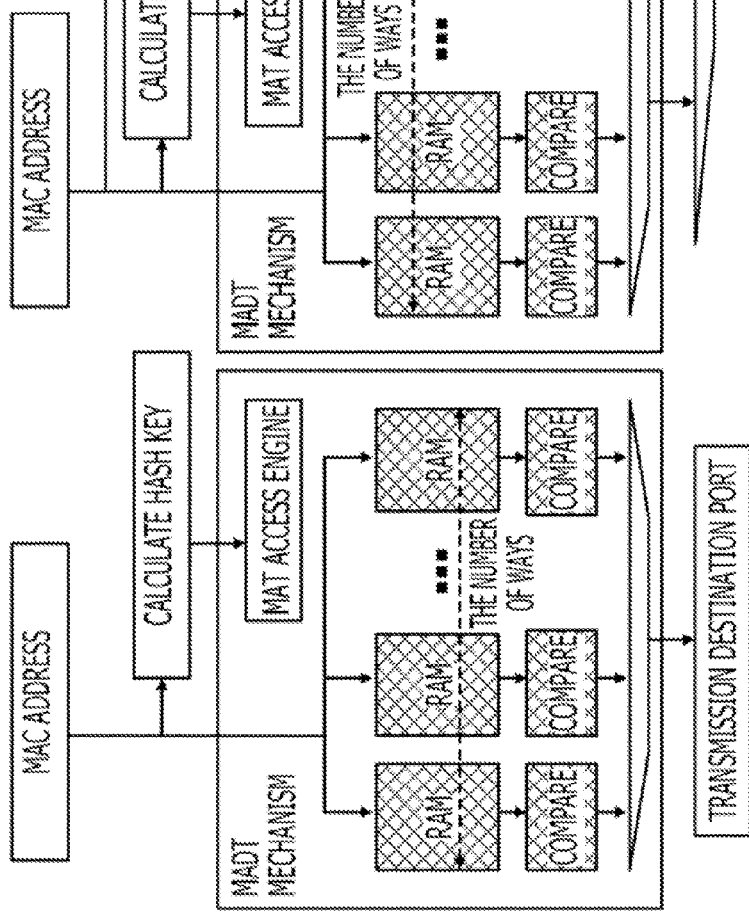
FIG. 12B RELATED ART
FIG. 12A RELATED ART

RELAY DEVICE, MAC ADDRESS SEARCH METHOD

CROSS-REFERENCE TO RELATED APPLICATIONS

This application is based upon and claims the benefit of priority of the prior Japanese Patent Application No. 2009-188220, filed on Aug. 17, 2009, the entire contents of which are incorporated herein by reference.

FIELD

Embodiments of the invention discussed herein relate to a relay device and a MAC address search method for searching for a MAC address by using a MAC address table.

BACKGROUND

A network switch, which is one of relay devices, searches for and registers a MAC address by accessing all memories (hereinafter referred to as RAMs) when accessing a MAC address table (hereinafter referred to as MADT).

FIG. 12A and FIG. 12B show schematic diagrams of a relay device according to the related art. The related art relay device obtains a MAC address attached to transmission data transmitted from outside, and then calculates a hash key on the basis of the obtained MAC address. Thereafter, a MADT access engine in the relay device searches all RAMs of MADT that is constituted by a plurality of RAMs by using the calculated hash key, and obtains a data pair formed of a transmission destination MAC address and a transmission destination port number. Thereafter, the MAC address obtained from outside and the MAC address searched from the MADT are compared with each other. When they match each other, transmission data is outputted via a physical port corresponding to the transmission destination port number searched from the MADT.

The relay device shown in FIG. 12A performs the above operation of the MAC address by using only the MADT, and the relay device shown in FIG. 12B performs the above operation more quickly by having a small MADT (hereinafter referred to as SMADT) in which a plurality of flip-flops (hereinafter referred to as FFs) are used as a storage section in addition to the MADT and by using the SMADT as a cache. In the relay device shown in FIG. 12B, the MAC address obtained from outside and a MAC address stored in the FFs are compared with each other by an SMADT access engine, and when they do not match each other, the above processing is performed by using the MADT.

FIG. 13 is a diagram for explaining an internal structure of the RAM constituting the MADT. The example shown in FIG. 13 is an example constituted by four RAMs (a four way arrangement). As shown in FIG. 13, each RAM included in the MADT is organized into storage areas each of which has a predetermined size, i.e., is configured to store a predetermined number of words. Each of the divided storage areas can store a data pair formed of a MAC address and a transmission destination port number.

A related art relay device accesses all the RAMs regardless of whether or not valid data is stored in the RAMs.

SUMMARY

A relay device includes a plurality of memories to store a plurality of data pairs, each data pair including a MAC address and a port number. The device does not search memories other than memories in which valid data pairs are stored when searching for a port number based upon a MAC address. The relay device further includes a data moving unit to move valid data pairs to different locations within the plurality of memories in order to reduce a total number of memories, amongst the plurality thereof, having valid data pairs. The relay device further includes a power supply controller to stop supplying power to ones of the memories storing only invalid data.

Advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIGS. 5A, 5B, 5C, 5D and 5E are diagrams for explaining an operation of the MADT by a moving unit according to the embodiment;

FIG. 6 is a flowchart showing an example of address search processing of the relay device (not including an SMADT mechanism) according to another embodiment of the invention;

FIGS. 12A-12B are schematic diagrams that together show an example of a relay device according to the related art.

DESCRIPTION OF EMBODIMENTS

As noted above, regardless of whether or not valid address data is stored in the RAMS, the related art relay device accesses all of the RAMs. Here, as a part of the inventive process, it has been observed that as the size of the related art MADT increases, the routing can be performed more efficiently, which is a beneficial consequence. Furthermore, as the size of the related art MADT increases, the power consumed by the MADT also increases, which is a detrimental consequence.

Figure 1A:
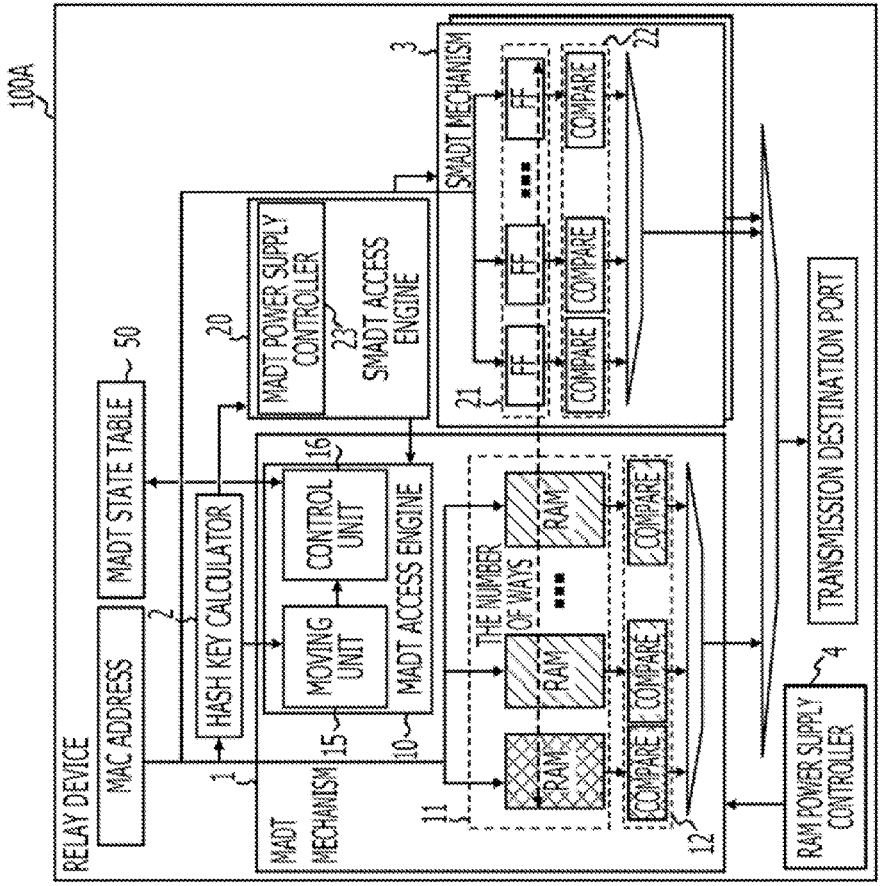
FIGS. 1A-1B are a schematic diagrams that together show an example of a relay device according to an embodiment of the invention.
Figure 1B:
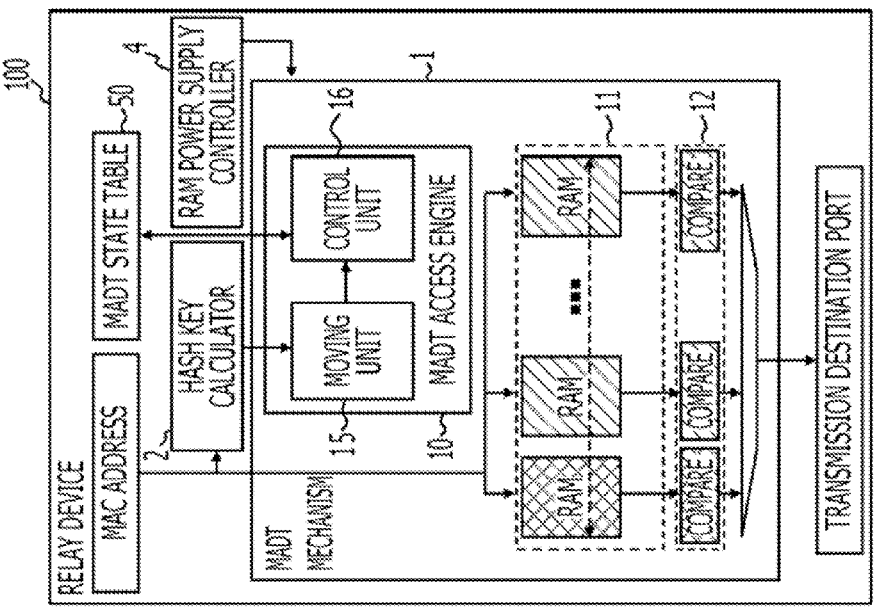

FIGS. 1A-1B together show an example of a relay device according to an embodiment of the invention. FIG. 1A is a relay device 100 including a MADT mechanism 1, and FIG. 1B is a relay device 100A that similarly includes the MADT mechanism 1 and also an SMADT mechanism 20. The relay device is, for example, a network switch or a router.

First, FIG. 1A will be described. The relay device 100 further includes a hash key calculator 2 that calculates a hash key from a MAC address obtained from outside, such as another relay device or a computer. The MADT mechanism 1 outputs a transmission destination port number on the basis of the hash key calculated by the hash key calculator 2. The relay device 100 also includes a MADT state table 50.

The MADT mechanism 1 includes a MADT access engine 10 that realizes power saving and a MADT 11 that includes a plurality of memories, e.g., RAMs, representing a plurality of storage sections. Each RAM in the MADT includes divided storage areas each of which has a predetermined size, i.e., is configured to store a desired number of words. Each of the storage areas can store at least a data pair formed of a MAC address and a transmission destination port number. The MADT mechanism 1 includes a comparator 12 that compares the MAC address obtained from outside and a MAC address searched by the hash key.

The MADT access engine 10 includes a moving unit 15 and a control unit 16.

The moving unit 15 moves data related to MAC addresses, and by doing so separates RAMs storing valid data from RAMs storing invalid data. The moving unit 15 responds to a change in terms of validity-state from stored data being valid to being invalid by moving the valid data into relatively fewer RAMs so as to reduce, if not minimize, a total number of RAMs needed to store all of the valid data. The moving unit 15, in effect, consolidates the valid data by moving the valid data so that data pairs formed of a MAC address and a transmission destination port number are collected in relatively fewer ones of the RAMs in the MADT 11.

MADT 11 may include conventional functions, e.g., a search function, a registration function, an age out (delete) function, etc. The control unit 16 includes a function to search a port number from a MAC address in order to search only those RAMs containing valid data, i.e., in order not to search RAMs other than the RAMs storing pairs formed of a MAC address and a transmission destination port number.

The relay device 100 includes a RAM power supply controller 4 (electric power supply controller) that stops supplying power (or interrupts the power supply) to RAMs that store only invalid data, i.e, to RAMs other than those storing valid data, on the basis of a value stored in the MADT state table 50.

The relay device 100A shown in FIG. 1B further includes a SMADT access engine 20 and a SMADT mechanism 3 (a cache) in addition to components of the relay device 100. The SMADT access engine 20 may include functions of a conventional SMADT mechanism, e.g., registration, deletion, etc. The SMADT access engine 20 further includes a MADT power supply controller 23 (second electric power supply controller) which disconnects power to the MADT mechanism 1 to stop power supply to all the RAMs when there is a corresponding MAC address in the SMADT mechanism 3 and supplies power to the MADT mechanism 1 when there is no corresponding MAC address in the SMADT mechanism 3.

The SMADT mechanism 3 may include functions similar to those of a conventional SMADT. Furthermore, the SMADT mechanism 3 includes a SMADT 21 and a comparator 22. The SMADT 21 includes FFs for storing at least data pairs formed of a MAC address and a transmission destination port number. The comparator 22 that compares the MAC address obtained from outside and the MAC address searched by the hash key.

For each of the RAMs, the MADT state table 50 stores an indication of whether data in a given RAM is valid, i.e., whether there is at least one active (valid) entry in the given RAM. The MADT access engine 10 accesses (or indexes into) the MADT state table 50 in order to perform search processing on only those RAMs that contain valid data.

Although components in the relay device 100 and the relay device 100A are mounted as circuits such as integrated circuits, the components may be realized by executing a program by a CPU (Central Processing Unit).

Figure 2:
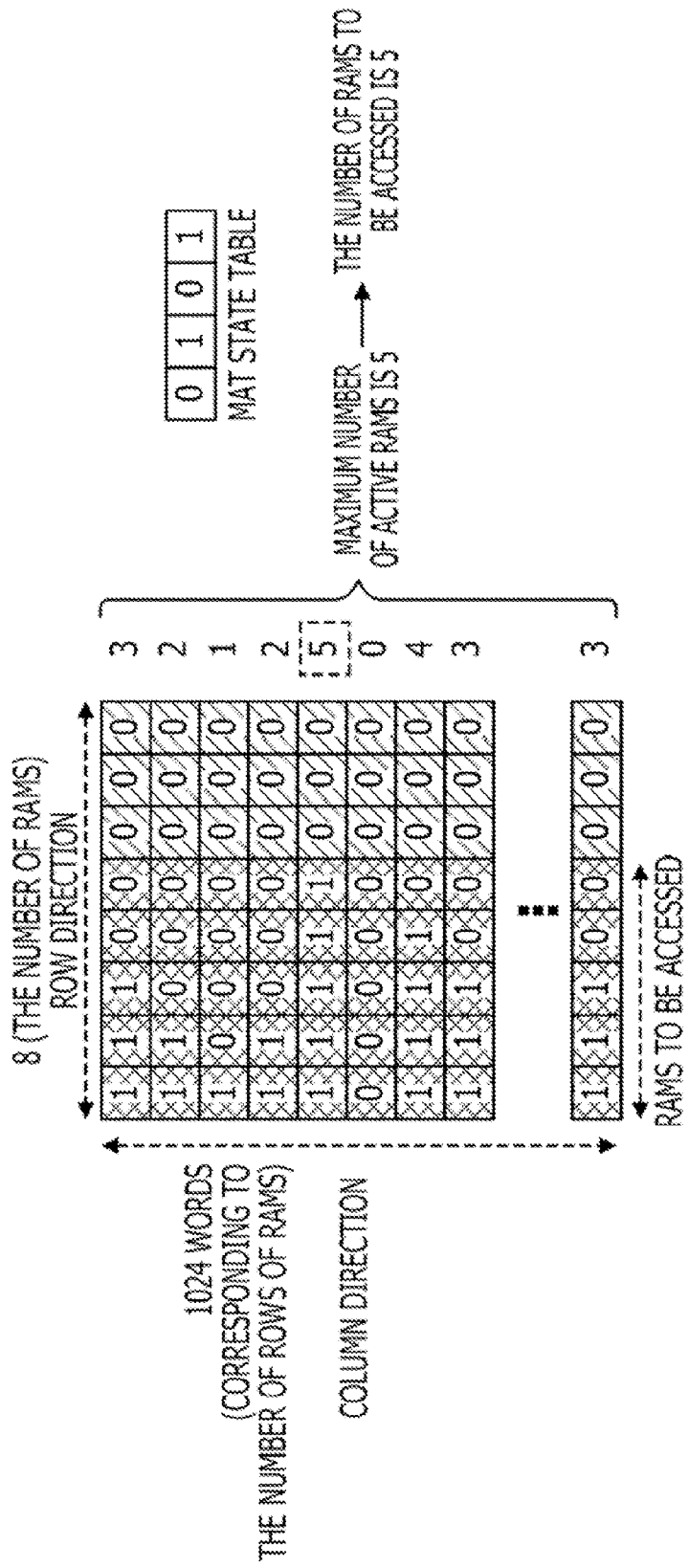
FIG. 2 is a diagram for explaining an example of an access control to a MADT by a control unit according to the embodiment.

An access control to the MADT 11 by the control unit 16 will be described with reference to FIG. 2. In an example of FIG. 2, the MADT 11 is an 8-way set associative using eight 1024-word RAMs. In FIG. 2, "1" indicates an active (valid) entry, and "0" indicates a non-active (invalid) entry. On the right side of the table of FIG. 2, the number of active entries in each row is shown. Although the actual table of FIG. 2 is a MADT, for convenience of description, the access control is described by using a table of bits.

The control unit 16 accesses the RAMs to check whether or not there is an aged out entry. Here, the control unit 16 obtains the number of active RAMs for each row, and stores the maximum value ("5" in the example of FIG. 2) of the results in the MADT state table 50. The MADT state table 50 may be implemented, e.g., as a 4-bit register.

When the control unit 16 searches a MAC address, the control unit 16 accesses the RAMs, the number of which is stored in the MADT state table 50, from the left-most RAM. In the example of FIG. 2, the control unit 16 accesses the five RAMs leftmost RAMs, i.e., the first five RAMs when viewed in a row direction starting at the edge of the left side and progressing towards the right side. In this way, the control unit 16 does not access RAMs storing no valid data, i.e., avoids accessing RAMs which cannot return valid data, so that electric power can be saved.

The RAM power supply controller 4 is responsive to the data-validity states indicated in the MADT state table 50. Alternatively, the MADT state table 50 could be responsive to search results received from the control unit 16. The RAM power supply controller 4 stops supplying power to the RAMs, according to a validity-state of data therein as indicated by corresponding entries in the MADT state table 50. In the example of FIG. 2, in the row direction, all entries in the three rightmost columns contain only "0" (logical zero), thereby indicating that the corresponding RAMs store data having only invalid validity-states. By contrast, again in the row direction, at least one entry in each of the five leftmost columns contain only a "1" (logical one), thereby indicating that the corresponding RAMs store data having only valid validity-states. Accordingly, the RAM power supply controller 4 stops supplying power to the three leftmost RAMs but continues supplying power to the five leftmost RAMs. In this way, the power supply to RAMs storing no valid data is stopped, so that electric power can be further saved.

Figure 3:
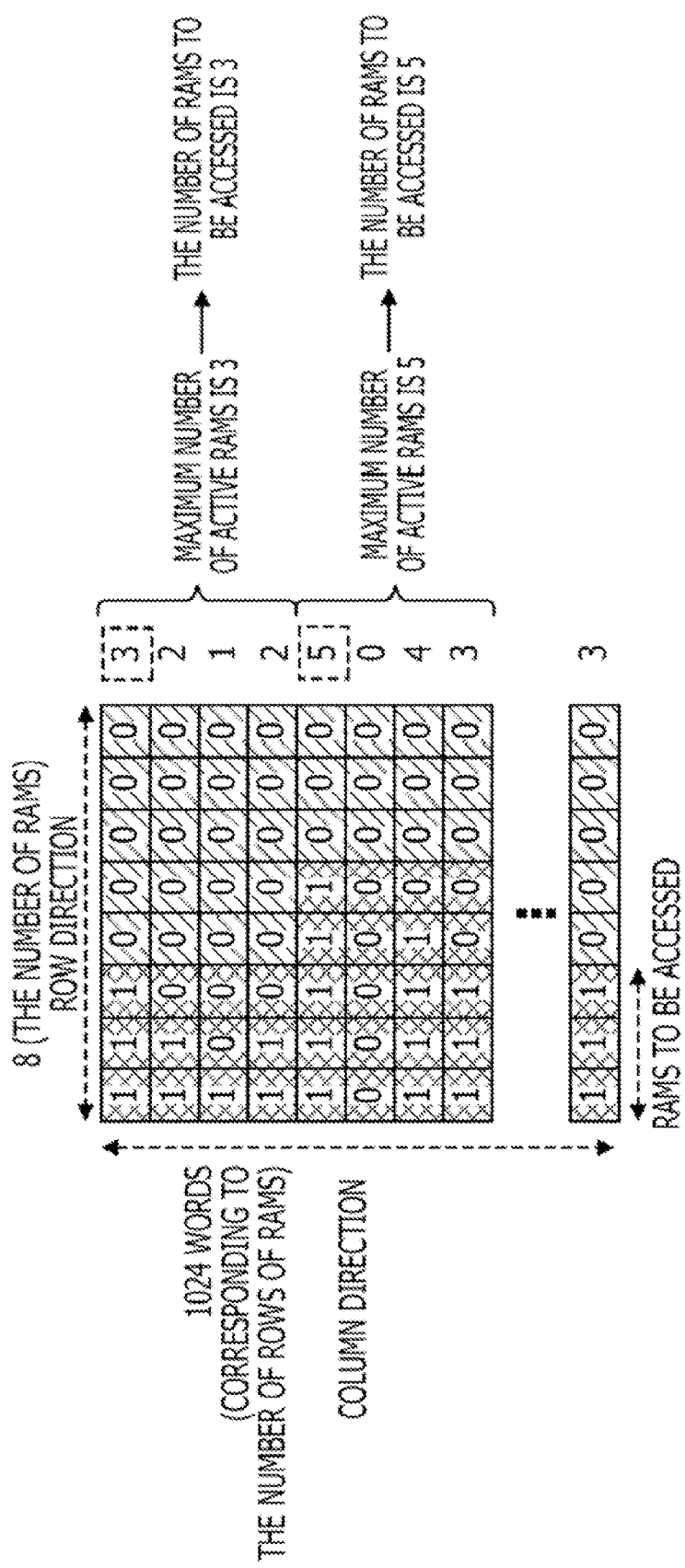
FIG. 3 is a diagram for explaining an example of grouping rows of a RAM according to the embodiment.

FIG. 3 shows an example in which rows of RAMs are grouped and the number of RAMs to be accessed is stored in the MADT state table 50 for each group. FIG. 3 shows an example in which the rows are grouped every four rows. In this way, the number of RAMs to be accessed can be further decreased compared with the example of FIG. 2. Although, in the example of FIG. 2, five RAMs need to be accessed regardless of which row is indicated by the hash key, in the example of FIG. 3, only three RAMs need to be accessed when the hash key indicates upper four rows.

Figure 4:
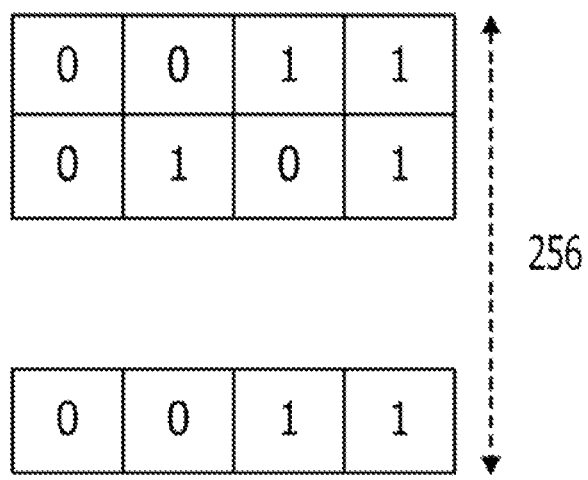
FIG. 4 is a diagram showing an example of a MADT state table when grouping rows of the RAM according to the embodiment.

On the other hand, the size of the MADT state table 50 becomes larger as shown in FIG. 4. When the RAMs are grouped every four rows as shown in the example of FIG. 3, the MADT state table 50 is a table of 256×4 bits. Although the actual table of FIG. 3 is a MADT, for convenience of description, the access control is described by using a table of bits.

Next, an operation of MADT 11 by the moving unit 15 will be described with reference to FIGS. 5A-5E. Although the actual tables of FIGS. 5A-5E are MADT, for convenience of description, tables of bits are used for description.

Figures 5A, 5B, 5C, 5D, 5E:
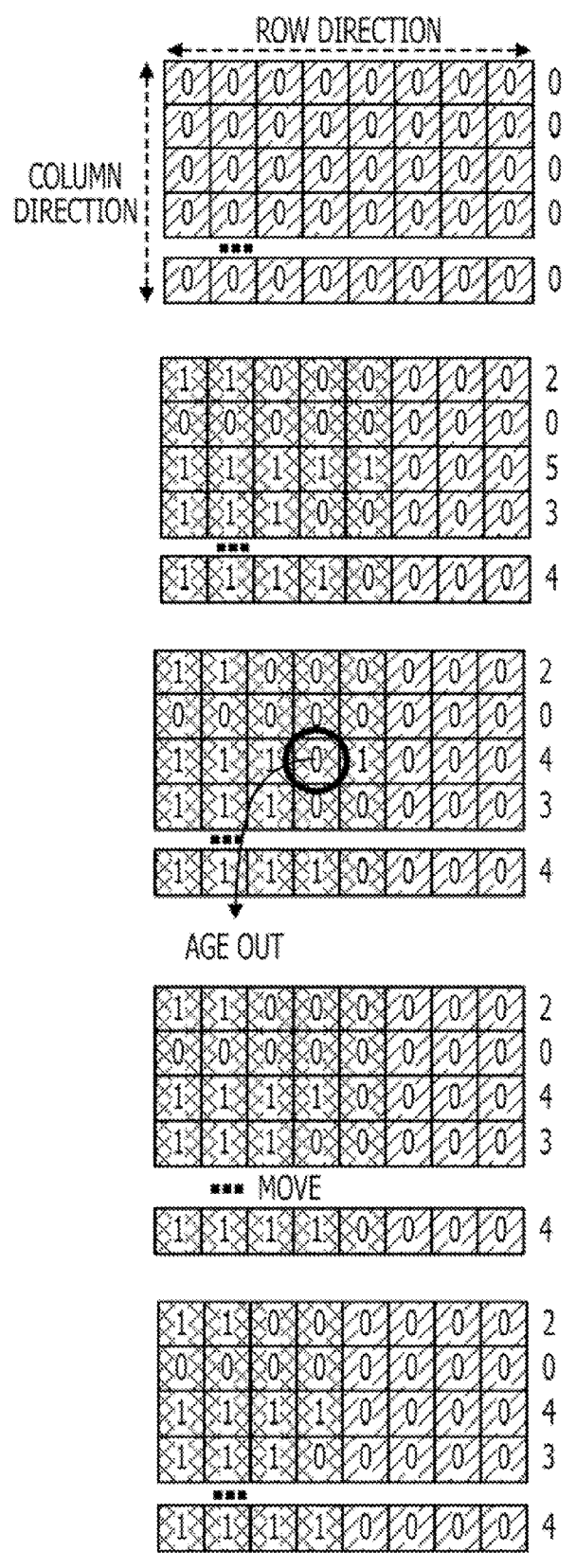

FIG. 5A shows an initial state in which there is no entry, and FIG. 5B shows a state in which addresses are registered thereafter in the MADT 11. When an entry is aged out to be emptied and becomes invalid data (refer to FIG. 5C), as shown in FIG. 5D, the moving unit 15 moves the registration information in the fifth column to the fourth column (or, in other words, towards a consolidation side of MADT 11 and away from a depletion side) in order to exclude the RAM corresponding to the fifth column from being included as part of an access target. FIG. 5E shows a state in which the registration information has been moved, and the RAM corresponding to the fifth column is excluded from being included as part of the access target.

In this embodiment, when aging occurs, the moving unit 15 changes the state of the MADT 11 from the state of FIG. 5C to the state of FIG. 5D, and the control unit 16 updates the MADT state table 50. The control unit 16 refers to the MADT state table 50, excludes RAMs in which MAC address is not registered from being included as part of the access target, and accesses only the RAMs in which MAC address is registered. The RAM power supply controller 4 refers to the MADT state table 50 and stops supplying power to the RAM from which the MAC address has been moved (the RAM in the fifth column in the example of FIG. 5E). By doing so, electric power is further saved. When a table operation such as learning or deletion to the MADT mechanism 1 occurs, the moving unit 15 updates the MADT state table 50.

Next, operations of the relay device 100 and the relay device 100A will be described with reference to flowcharts in FIGS. 6 to 11.

First, FIG. 6 shows a flowchart of address search processing of the relay device 100 (not including the SMADT mechanism 3). The relay device 100 obtains a MAC address of transmission destination from outside (S1), and the hash key calculator 2 calculates a hash key from the obtained MAC address (S2). The control unit 16 refers to the MADT state table 50, selects RAMs to be searched (S3), and accesses the selected RAMs by using the hash key. The control unit 16 obtains a MAC address and a transmission destination port number from each RAM, and outputs the obtained MAC addresses and transmission destination port numbers to the comparator 12 (S4). When the rows are grouped as shown in FIG. 3, in the processing of step S3, the control unit 16 learns which group should be accessed from the hash key, and obtains the numerical number of the group, so that the control unit 16 selects RAMs to be accessed.

The comparator 12 compares the transmission destination MAC address obtained in step S1 and the MAC addresses outputted in step S4 (S5). As a comparison result, if there is a matched entry (S6: YES), the port of the transmission destination port number corresponding to the MAC address becomes the data output destination port (S7). On the other hand, if there is no matched entry (S6: NO), the relay device 100 generates flooding because the address is not registered (S8).

Figure 7:
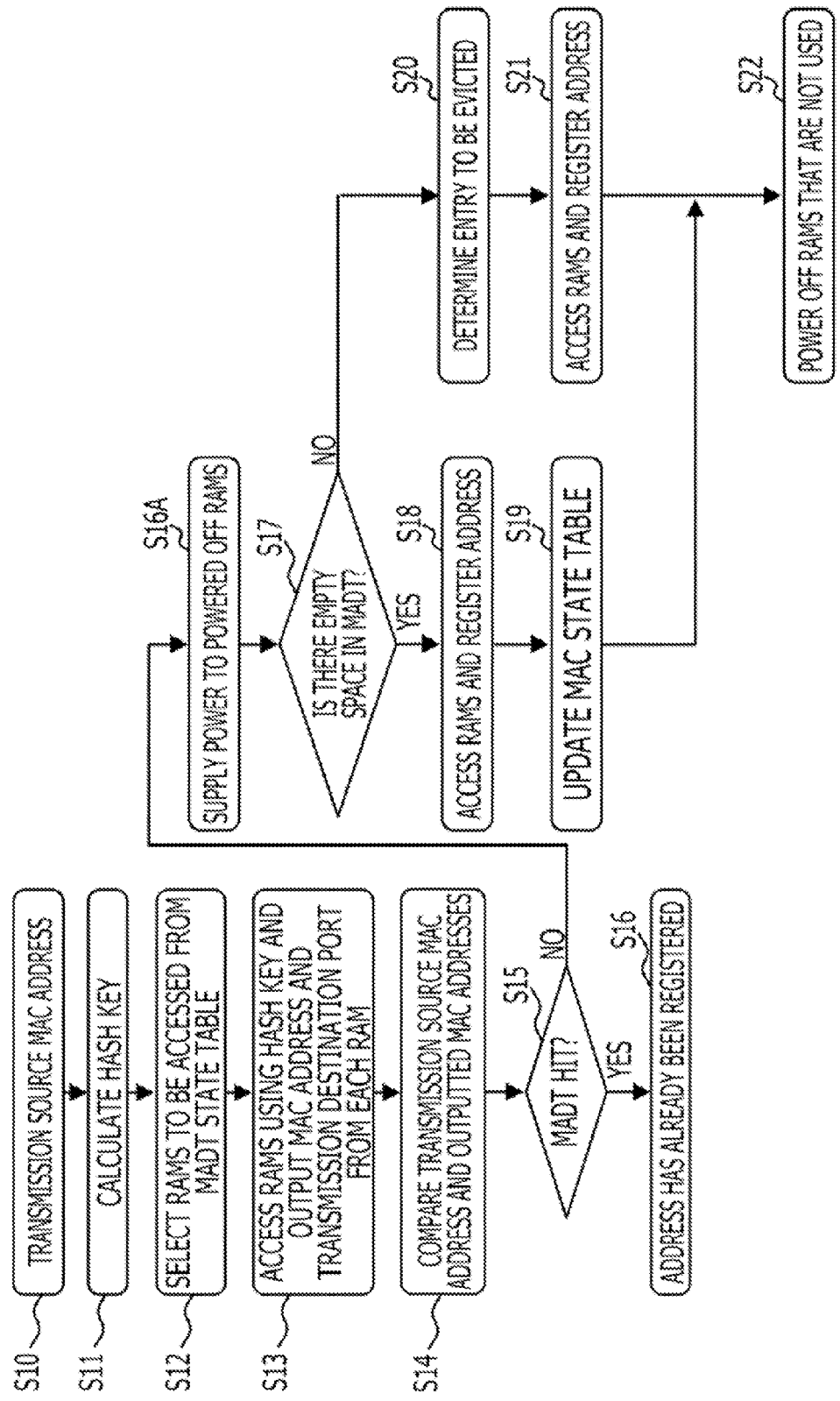
FIG. 7 is a flowchart showing an example of address registration processing of the relay device (not including the SMADT mechanism) according to the embodiment.

Next, address registration processing of the relay device 100 (not including the SMADT mechanism 3) will be described with reference to FIG. 7. Description of the processing from step S10 to step S15 in FIG. 7 will be omitted because the processing is the same as the processing from step S1 to step S6 in FIG. 6 except that a MAC address to be a transmission source is obtained and this transmission source MAC address is processed.

In step S15, if there is a matched entry in the MADT 11 of the MADT mechanism 1 (S15: YES), the process ends because the transmission source MAC address has already been registered (S16). On the other hand, if there is no matched entry in the MADT 11 of the MADT mechanism 1 (S15: NO), the RAM power supply controller 4 supplies power to RAMs to which power supply is currently stopped (S16A), and the control unit 16 determines whether or not there is an empty space in the MADT 11 of the MADT mechanism 1 (S17). If there is an empty space in the MADT 11 (S17: YES), the control unit 16 accesses the RAMs, registers the transmission source MAC address (S18), and updates the MAC state table 50 as necessary (S19). If it is determined that there is no empty space in step S17 (S17: NO), the control unit 16 determines an entry to be evicted (S20), and registers the transmission source MAC address in the entry (S21).

The RAM power supply controller 4 refers to the MADT state table 50 and stops power supply to RAMs in which no MAC address is registered (S22).

Figure 8:
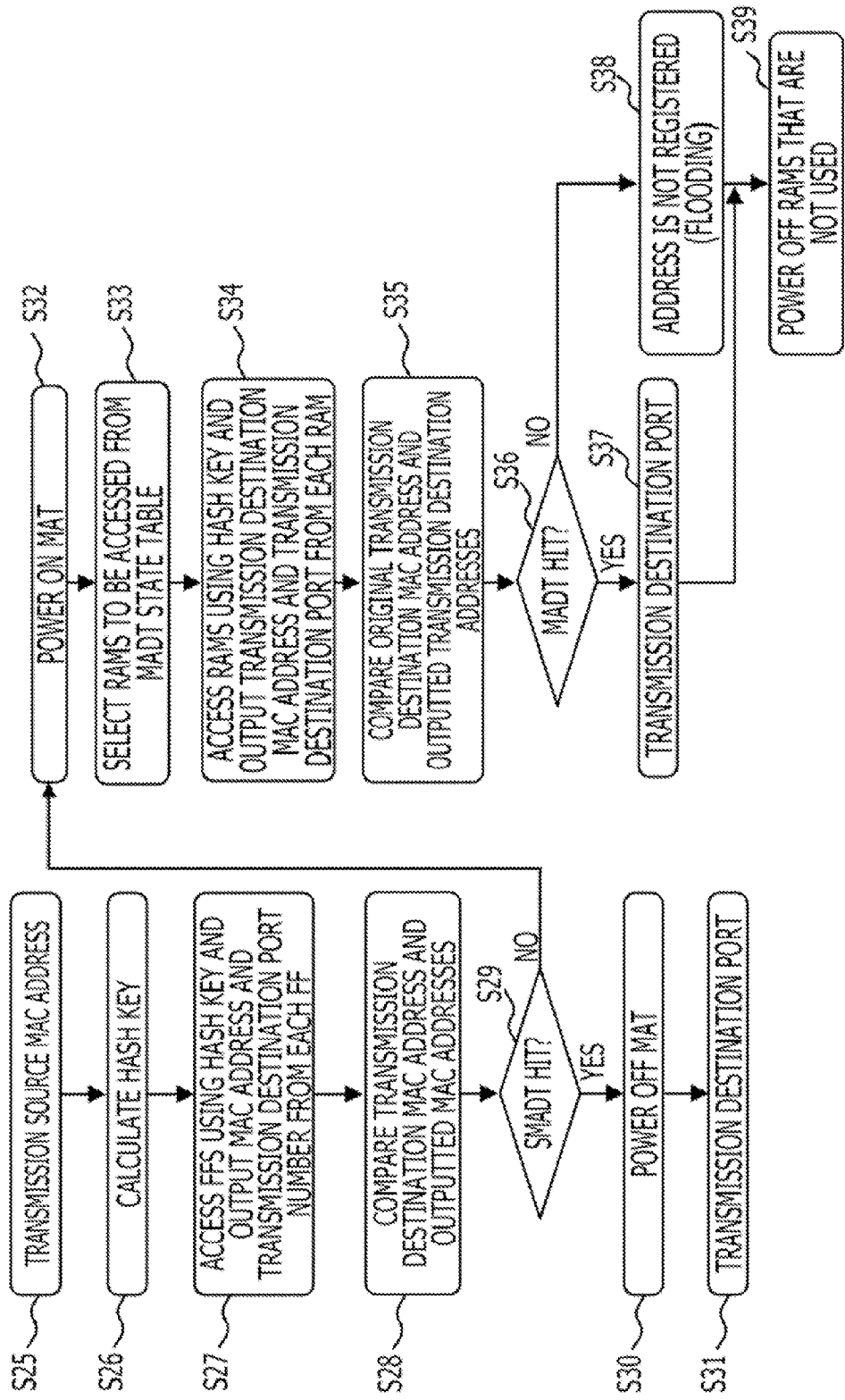
FIG. 8 is a flowchart showing an example of address search processing of the relay device (including the SMADT mechanism) according to the embodiment.

Next, address search processing of the relay device 100A (including the SMADT mechanism 3) will be described with reference to FIG. 8. In the same way as steps S1 and S2 in FIG. 6, the transmission destination MAC address is obtained (S25) and the hash key is calculated (S26). Thereafter, the SMADT access engine 20 accesses the SMADT 21 by using the calculated hash key, and outputs MAC addresses and transmission destination port numbers stored in the SMADT 21 to the comparator 22 (S27). The comparator 22 compares the transmission destination MAC address obtained in step S25 and the MAC addresses outputted in step S27 (S28). As a comparison result, if there is a matched MAC address in the SMADT 21 (S29: YES), the MADT power supply controller 23 performs power off processing of the MADT mechanism 1 (S30), and determines that the port of the transmission destination port number corresponding to the MAC address is the data output destination port (S31).

On the other hand, if there is no matched MAC address in the SMADT 21 (S29: NO), the MADT power supply controller 23 turns on the power of the MADT mechanism 1 (S32). Description of the processing from the next step S33 to step S38 will be omitted because the processing is the same as the processing from step S3 to step S8 in FIG. 6.

The RAM power supply controller 4 refers to the MADT state table 50 and stops power supply to RAMs in which no MAC address is registered (S39).

Figure 9:
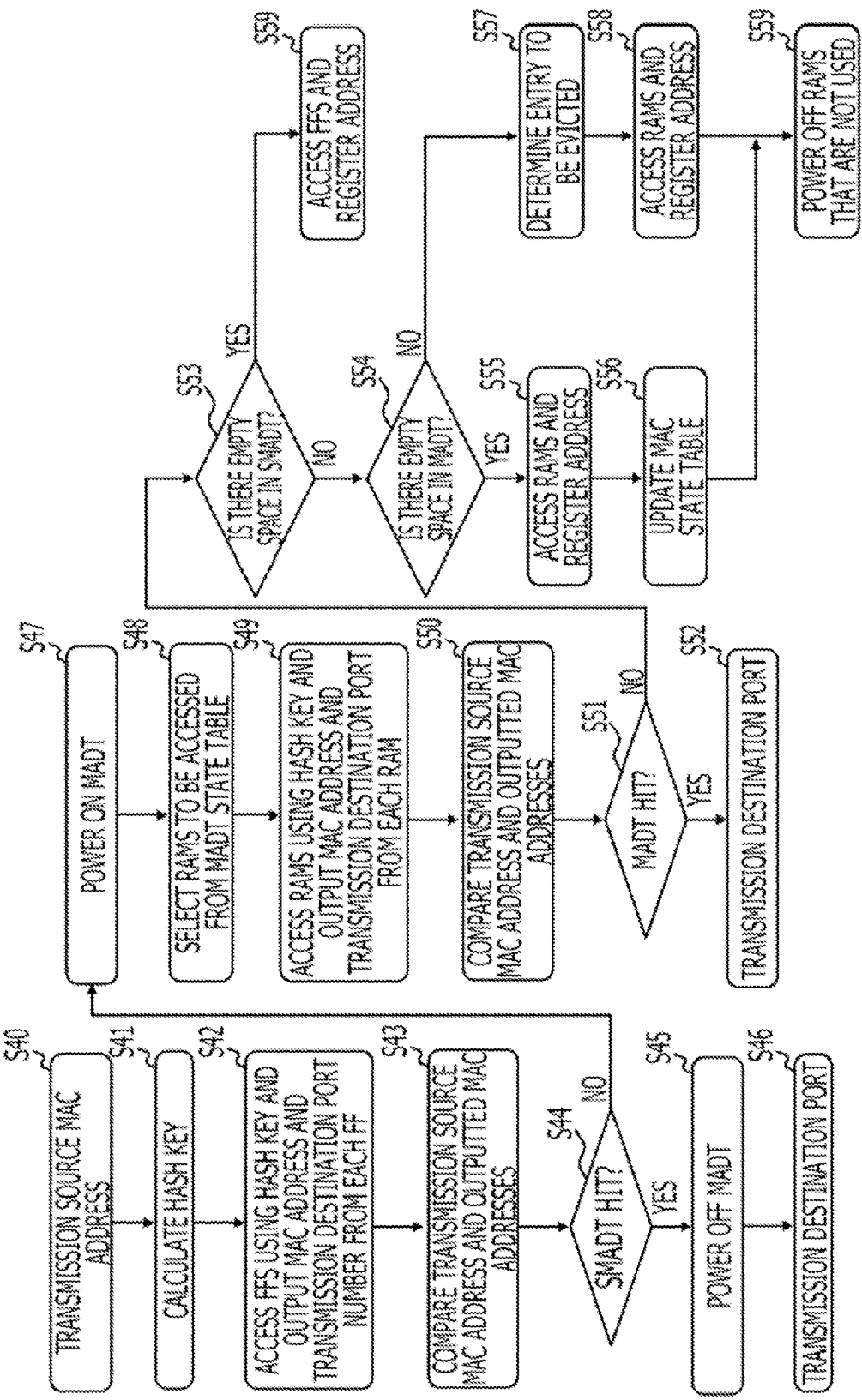
FIG. 9 is a flowchart showing an example of address registration processing of the relay device (including the SMADT mechanism) according to the embodiment.

Address registration processing of the relay device 100A (including the SMADT mechanism 3) will be described with reference to FIG. 9. Description of the processing from step S40 to step S52 will be omitted because the processing is the same as the processing from step S25 to step S37 in FIG. 8 except that a MAC address to be a transmission source is obtained and this transmission source MAC address is processed.

In step S51, if there is no matched entry in the MADT 11 of the MADT mechanism 1 (S51: NO), the SMADT access engine 20 determines whether or not there is an empty space in the SMADT 21 of the SMADT mechanism 3 (S53). If there is an empty space in the SMADT 21 (S53: YES), the SMADT access engine 20 accesses the SMADT 21 and registers the transmission source MAC address (S59). Description of the processing from step S54 to step S59 when there is no empty space in the SMADT 21 (S53: NO) will be omitted because the processing is the same as the processing from step S17 to step S22 in FIG. 7.

Next, address deletion processing will be described with reference to FIGS. 10 and 11.

Figure 10:
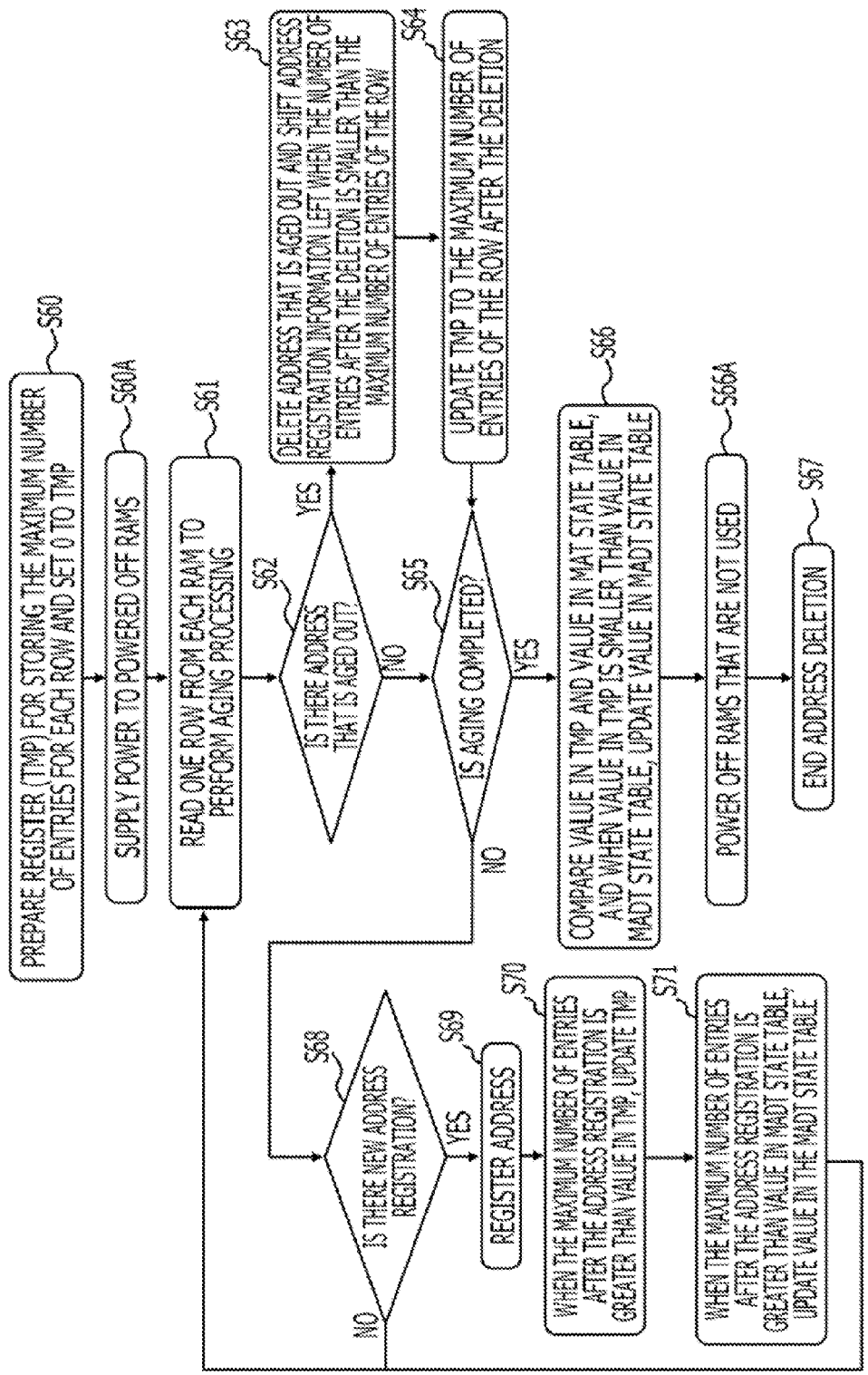
FIG. 10 is a flowchart showing an example of address deletion processing of the relay device according to the embodiment (not including grouping)

First, FIG. 10 shows the address deletion processing of the relay device 100 and the relay device 100A when inside of the MADT 11 is not grouped. The control unit 16 of the MADT access engine 10 sets a value "0" to a register (hereinafter referred to as "tmp") which is provided in advance and stores the maximum number of entries for each row (S60). Next, the RAM power supply controller 4 supplies power to RAMs to which power supply is currently stopped (560A), and the control unit 16 reads row by row from each RAM in order to perform aging processing (S61). If there is a MAC address that is aged out (S62: YES), the control unit 16 deletes address registration information that is a data pair formed of the MAC address that is aged out and transmission destination port number from the RAM, and the moving unit 15 shifts the address registration information, e.g., left (towards a consolidation side and away from a depletion side) when the number of entries after the deletion is smaller than the maximum number of entries of the row (S63).

After the deletion, the control unit 16 compares the value stored in the tmp and the number of entries in the row that is currently processed, and when the number of entries in the row that is currently processed is greater than the value stored in the tmp, the control unit 16 updates the value in the tmp (S64).

On the other hand, if there is no MAC address that is aged out in step S62 (S62: NO), the process proceeds to S65.

When aging of all the rows is completed (S65: YES), the control unit 16 compares the value in the tmp and the value in the MADT state table 50, and when the value in the tmp is smaller than the value in the MADT state table, the control unit 16 updates the value in the MADT state table to the value in the tmp (S66). The RAM power supply controller 4 refers to the MADT state table 50 and stops power supply to RAMs in which no MAC address is registered (S66A), and the MAC address deletion processing ends (S67).

On the other hand, when aging of all the rows is not completed (S65: NO), the control unit 16 determines whether or not there is new registration of MAC address (S68), and when there is no new registration (S68: NO), the process returns to step S61, and the control unit 16 performs processing on the next row. When there is a new registration (S68: YES), the control unit 16 registers the MAC address (S69), and when the maximum number of entries after the address registration is greater than the value stored in the tmp, the control unit 16 updates the value stored in the tmp (S70). When the maximum number of entries after the address registration is greater than the value set in the MADT state table 50, the control unit 16 also updates the value stored in the MADT state table 50 (S71), and the process returns to step S61 and the next row is processed.

Figure 11:
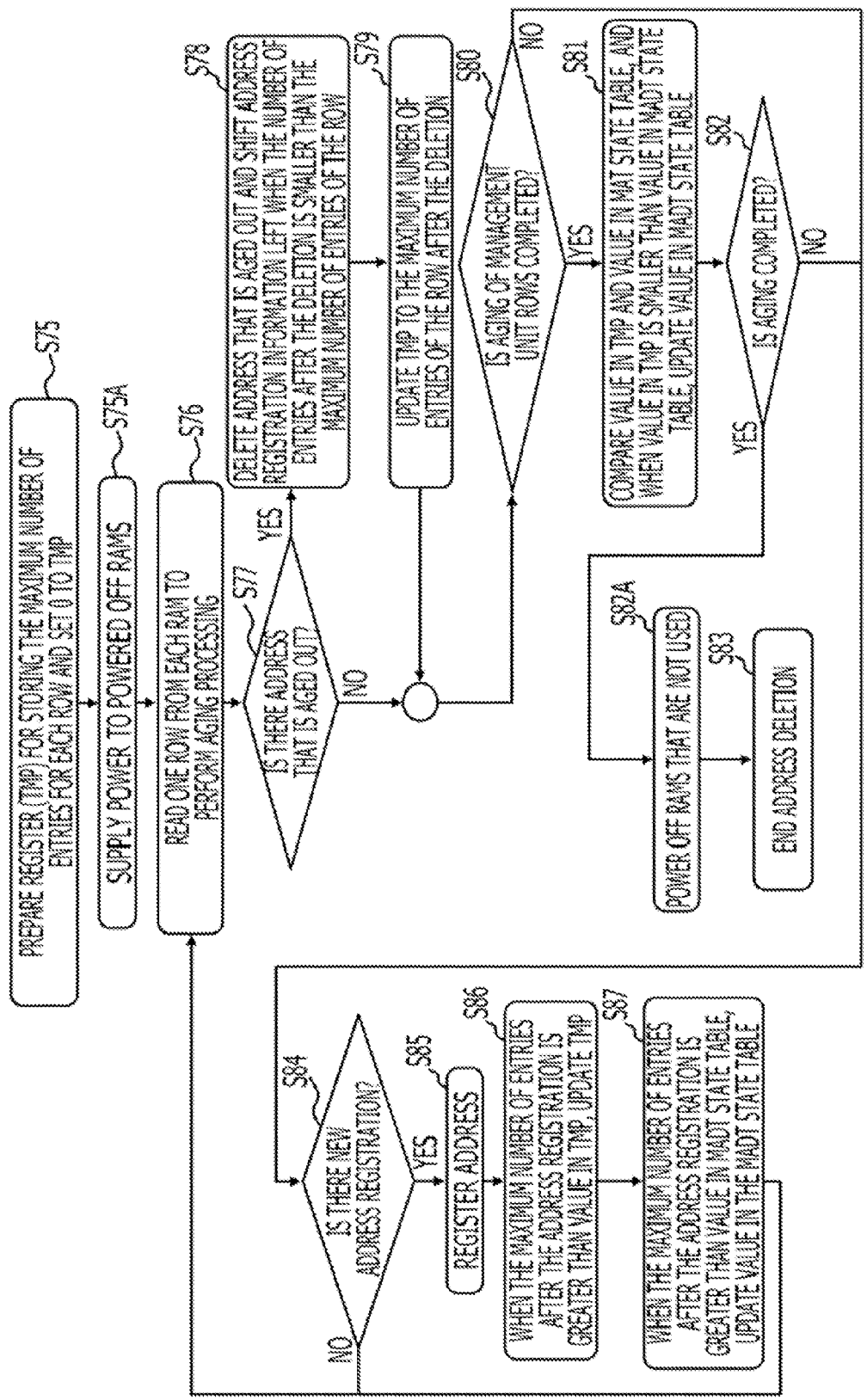
FIG. 11 is a flowchart showing an example of address deletion processing of the relay device according to the embodiment (including grouping)
Figure 13:
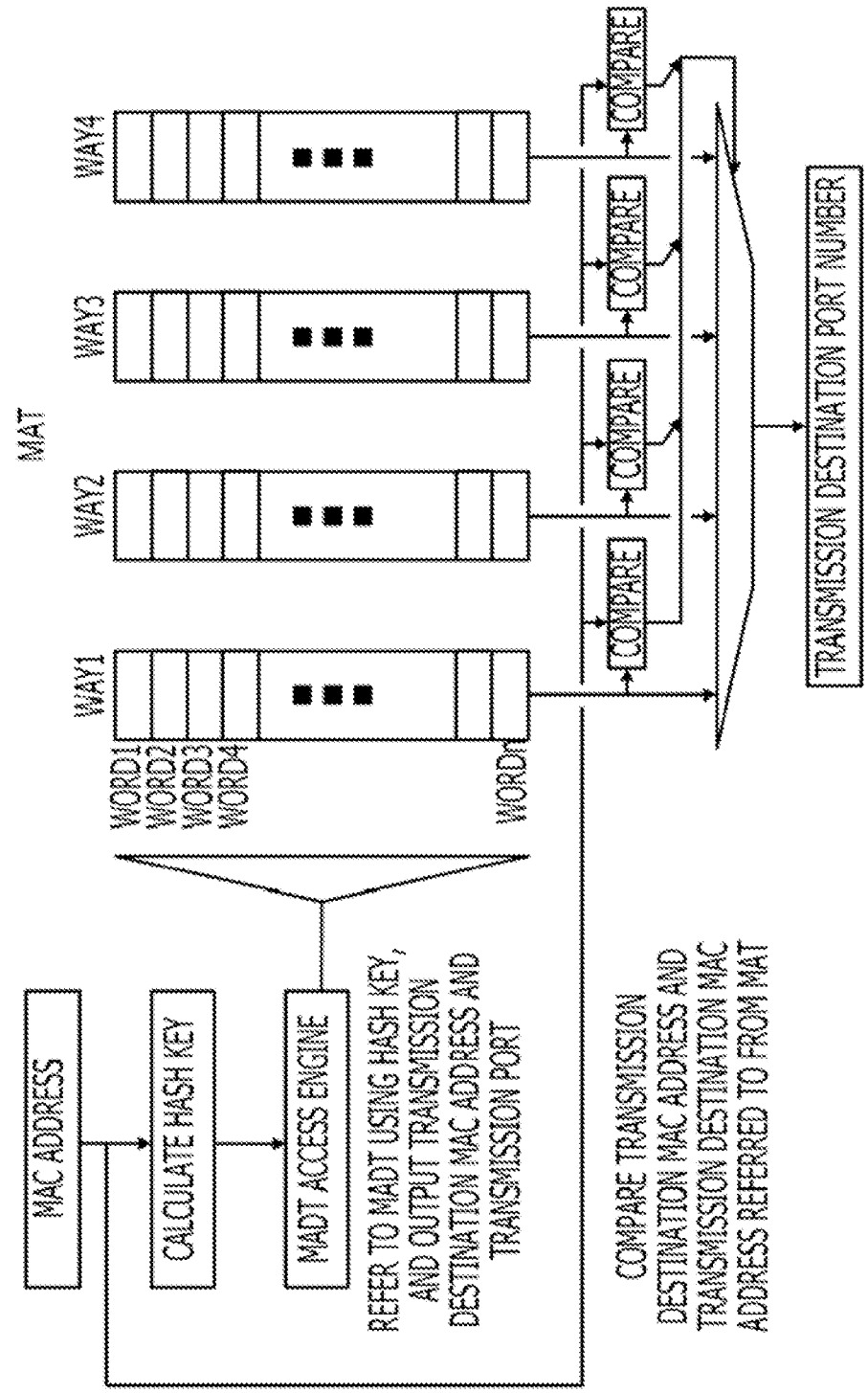
FIG. 13 is a diagram for explaining an internal structure of a RAM constituting a MADT according to the related art.

Next, FIG. 11 shows the address deletion processing of the relay device 100 and the relay device 100A when inside of the MADT 11 is grouped. Description of the processing from step S75 to step S79 will be omitted because the processing is the same as the processing from step S60 to step S64 in FIG. 10.

When there is no MAC address that is aged out (S77: NO), or after the processing of step S79 is performed, the control unit 11 determines whether or not aging of management unit rows (in the MADT 11, a desired number of rows are grouped as a unit, and the management unit rows are the desired number of rows) is completed (S80). When aging of the management unit rows is completed (S80: YES), the control unit 16 compares the value stored in the tmp and the value stored in the MADT state table 50, and when the value in the tmp is smaller than the value in the MADT state table 50, the control unit 16 updates the value in the MADT state table 50 to the value in the tmp (S81). The control unit 16 determines whether or not aging of all the rows is completed (S82), and when the aging is completed (S82: YES), the RAM power supply controller 4 refers to the MADT state table 50 and stops power supply to RAMs in which no MAC address is registered (S82A), and then the MAC address deletion processing ends (S83).

On the other hand, when the aging of the management unit rows is not completed (S80: NO), or when the aging of all the rows is not completed (S82: NO), the processing proceeds to step S84. Description of the processing from step S84 to step S87 will be omitted because the processing is the same as the processing from step S68 to step S71 in FIG. 10.

Although, in this embodiment, the moving unit 15 moves the data to, e.g., the left RAM, the moving unit 15 may move the data to the right RAM. In other words, the moving unit 15 moves the data towards a consolidation side (e.g., the left side) and away from a depletion side (e.g., the right side). Alternatively, the consolidation side may be the right side and the depletion side may be the left side.

Although, in this embodiment, the RAMs in which MAC address is stored are separated from the other RAMs by storing data so that the data is shifted towards a consolidation side of the row and away from a depletion side of the row, various methods, such as storing data in every other RAM or calculating the position to store the data, can be employed to reduce, if not minimize, the total number of RAMs needed to store valid data.

By managing the access target RAMs in which MAC address is registered and stopping the clock or power supply to the RAMs that are not the access target and logic circuits related to the RAMs by using this embodiment, it is possible to realize power saving. An electric power to operate the MAC address table can be saved.

Further, when accessing the MADT, by using the SMADT that is a table for a small amount of entries and located outside of the MADT, and stopping the clock or power supply to a MADT main body and logic circuits related to the MADT main body when an SMADT hit occurs, power saving is realized.

Power saving of IT equipment is an urgent issue, and in particular it is expected that power consumption of relay devices will increase dramatically from now on. By this embodiment, power consumption of relay devices can be significantly reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the invention have been described in detail, it should be understood that the various changes, substitutions, and alterations could be made hereto without departing from the spirit and scope of the invention.

What is claimed is:
1. A relay device comprising:

a plurality of memories, each memory being operable to store at least a data pair formed of a MAC address and a port number;

a search unit to search only amongst ones of the memories having valid data pairs when searching for a port number based upon a MAC address;

a data moving unit to move valid data pairs to different locations within the plurality of memories; and a power supply controller to selectively stop supplying power to ones of the memories storing only invalid data, the plurality of memories is organized into rows and columns, each of the plurality of memories is organized into a plurality of storage areas, each storage area being arranged to store at least one instance of the data pair, and when an arrangement direction of the plurality of memories is defined as a row direction and an arrangement direction of the plurality of storage areas is defined as a column direction, if a data pair in the storage area is moved or deleted, the data moving unit is further operable responsively to consolidate valid data pairs within the memories by moving valid data pairs in a row direction towards a consolidation side of the rows and away from a depletion side of the rows to thereby reduce a total number of memories containing valid data, the when a data pair in one of the storage areas is moved or deleted, the data moving unit is further operable to shift the data pair in a row direction towards a consolidation side and away from a depletion side, and the search unit is further operable to count, for each row, a number of the storage areas in which a data pair is held, for each row direction and to not search storage units other than storage units from the consolidation side, the number of which is a maximum number of the counted numbers, when the plurality of storage areas are divided into a plurality of groups in the column direction, the search unit is further operable to count the number of the storage areas in which a data pair is held for each row direction, to obtain a maximum value of the counted numbers for each group, and, for each group, to not search storage units other than storage units from a side of a row, the number of which is the maximum number of the counted numbers of the group.

2. The relay device according to claim 1, further comprising:
a cache to temporarily store one of the data pairs; and
a second electric power supply controller to stop supplying power to the plurality of memories when a search of the cache unit is successfully performed.

3. The relay device according to claim 1, wherein the searching unit determines whether the data pairs are active.

4. A search method performed by a relay device including a plurality of memories each of which is operable to store at least a data pair including a MAC address and a port number, the method comprising:
moving valid data pairs to different locations within the plurality of memories, performed by a relay device;
searching only amongst ones of the memories having valid data pairs when searching a port number based upon a MAC address;
selectively stopping power to ones of the plurality of memories storing only invalid data, each of the plurality of memories is organized into a plurality of storage areas, each storage area being arranged to store at least a data pair formed of a MAC address and a corresponding port number, consolidating valid data pairs within the memories and thereby reducing a total number of memories containing valid data when an arrangement direction of the plurality of memories is defined as a row direction and an arrangement direction of the plurality of storage areas is defined as a column direction, if a data pair in the storage area is moved or deleted, shifting the data pair in a row direction towards a consolidation side and away from a depletion side when a data pair in one of the storage areas is moved or deleted, and counting, for each row, the number of the storage areas in which a data pair is held for each row direction and to not search without searching storage units other than storage units from the side, the number of which is a maximum number of the counted numbers, and obtaining a maximum value of the counted numbers for each group, and, for each group, searching without searching storage units other than storage units from the side, the number of which is the maximum number of the counted numbers of the group when the plurality of storage areas are divided into a plurality of groups in the column direction, counting the number of the storage areas in which a data pair is held for each row direction.

5. The method according to claim 4, wherein the relay device includes a cache to temporarily store the data, the method further comprising:
stopping a supply to consolidate valid data within the memories and thereby reduce a total number of memories containing valid data.

6. The search method according to claim 4, further comprising determining whether the data pairs are active.

7. The search method according to claim 6, wherein the data pairs are valid when the data pairs are active.

8. A relay device comprising:
a plurality of memories, each memory being operable to store at least a data pair formed of a MAC address and a port number;
a validity unit to monitor validity-states of data pairs stored in the memories, provide indications of the same, and determine whether the data pairs are active;
a data consolidation unit to consolidate data pairs in relatively fewer ones of the memories so as to reduce a total number of RAMs needed to store data when the validity-states of the data pairs indicates that the data pair is valid; and
a power supply controller responsive to the validity unit, to selectively stop supplying power to ones of the memories storing only invalid data, the data consolidation unit is further operable to consolidate valid data pairs by moving the valid data pairs to different locations within the plurality of memories in order to reduce a total number of memories, amongst the plurality thereof, having valid data pairs, the plurality of memories is organized into rows and columns; and the data consolidation unit is further operable to move valid data pairs in a row direction towards a consolidation side of the rows and away from a depletion side of the rows to thereby reduce a total number of memories containing valid data, the data consolidation unit is further operable to count, for each row, a number of the memories in which a data pair is held, for each row direction and to not search memories other than memories from the consolidation side, the number of which is a maximum number of the counted numbers, the plurality of memories are divided into a plurality of groups in a column direction, the data consolidation unit is further operable to count a number of the memories in which a data pair is held for each row direction, to obtain a maximum value of the counted numbers for each group, and, for each group, to not search storage units other than storage units from a side of a row, the number of which is the maximum number of the counted numbers of the group.

9. The relay device according to claim 8, wherein the data pairs are valid when the data pairs are active.

10. The relay device according to claim 3, wherein the data pairs are valid when the data pairs are active.

* * * * *